United States Patent [19]

Albert et al.

[11] Patent Number: 5,870,469
[45] Date of Patent: Feb. 9, 1999

[54] METHOD FOR TESTING THE INTACTNESS OF STORED DATA IN A PROCESSING FACILITY FOR SHEET MATERIAL SUCH AS BANK NOTES OR PAPERS OF VALUE

[75] Inventors: Bodo Albert, München; Wilhelm Buntscheck, Wolfratshausen, both of Germany

[73] Assignee: Giesecke & Devrient GmbH, München, Germany

[21] Appl. No.: 737,983

[22] PCT Filed: Mar. 19, 1996

[86] PCT No.: PCT/EP96/01178

§ 371 Date: Feb. 13, 1997

§ 102(e) Date: Feb. 13, 1997

[87] PCT Pub. No.: WO96/29683

PCT Pub. Date: Sep. 26, 1996

[30] Foreign Application Priority Data

Mar. 23, 1995 [DE] Germany ............... 195 10 626.1

[51] Int. Cl.[6] ............................................. H04L 9/00
[52] U.S. Cl. .................. 380/4; 380/2; 380/9; 380/49; 380/59
[58] Field of Search ................... 380/2, 3, 4, 9, 380/21, 23, 24, 25, 28, 49, 50, 51, 54, 55, 59

[56] References Cited

U.S. PATENT DOCUMENTS

| 4,908,861 | 3/1990 | Brachtl et al. | 380/25 |
| 5,007,089 | 4/1991 | Matyas et al. | 380/49 |
| 5,144,659 | 9/1992 | Jones | 380/4 |
| 5,231,666 | 7/1993 | Matyas | 380/25 |
| 5,421,006 | 5/1995 | Jablon et al. | 380/4 X |
| 5,572,590 | 11/1996 | Chess | 380/4 |
| 5,724,425 | 3/1998 | Chang et al. | 380/25 |

*Primary Examiner*—Bernarr E. Gregory
*Attorney, Agent, or Firm*—Bacon & Thomas PLLC

[57] ABSTRACT

For testing the intactness of stored data, intact data corresponding to the data to be tested from a component of the processing facility in a certain operating state of the processing facility in the intact state are first stored in a test device. To check the intactness of the data to be tested in a component a key is produced in the test device for each test, said key being different from those of prior tests. Using this key and a cryptographic algorithm one prepares two cryptograms. One cryptogram is prepared from the data to be tested by the component of the processing facility in which the data to be tested are stored. The other cryptogram is prepared from the intact data by the test device. After that the two cryptograms are compared with each other. If the cryptograms match, the data to be tested match the intact data and thus have no undesirable changes.

18 Claims, 9 Drawing Sheets

METHOD FOR TESTING THE INTACTNESS OF STORED DATA IN A PROCESSING FACILITY FOR SHEET MATERIAL SUCH AS BANK NOTES OR PAPERS OF VALUE

BACKGROUND OF THE INVENTION a) Field of the Invention

This invention relates to a method for testing the intactness of stored data in a processing facility for sheet material such as bank notes or papers of value.

b) Discussion of Related Technology

Such a processing facility is generally constructed of several components. Each of these components fulfills certain functions in processing the sheet material. One component of the processing facility is a control device which ranks higher than the other components. The control device controls the individual operations of the processing facility. The other components are designed as modules which perform the actual processing of the sheet material. Possible processing operations of individual modules are e.g. singling the sheet material from a stack, testing the sheet material for state or authenticity, transporting the sheet material, stacking or destroying the sheet material.

The processing facility components can be provided with memories for storing data necessary for operating the processing facility. These data can be for example control commands, programs, result data or reference data. The individual components of the processing facility are interconnected in such a way that data can be transferred between them.

The processing facility can be operated in different operating states. The operating states can be fixed for example by the operator inputting certain parameters. Such parameters can be the number of sheets to be tested, the denomination of bank notes, the type or quality of certain test criteria or similar information.

DE-PS 27 60 453 discloses such a processing facility. For storing data both the control device and individual modules have their own memories for storing data necessary for operating the processing facility. The data exchange between the control device and the modules is performed via a main memory which both the modules and the control device can access. In addition the modules are directly interconnected for data exchange.

DE-OS 33 47 607 shows a processing facility wherein a plurality of similar modules are used for optically testing the sheet material. Both the control device and the individual modules have their own memories for storing data. The individual modules are connected with one another and with the control device via a data bus. A higher-order memory which all components of the processing facility can access is additionally connected to the data bus.

In apparatus of the stated type undesirable changes can generally occur in the data stored in the processing facility. These changes can arise either from disturbances in the processing facility, such as data transmission errors or data loss, or from deliberate manipulation of the data with intent to defraud.

Known apparatus are provided with no measures for ascertaining undesirable changes in the data stored in the processing facility.

On these premises the invention is based on the problem of proposing a method for testing the intactness of data stored in a processing facility for sheet material to permit ascertainment of changes in said data.

SUMMARY OF THE INVENTION

The basic idea of the invention is substantially first to store in a test device intact data corresponding to the data to be tested from a component of the processing facility in a certain operating state of the processing facility in the intact state. To check the intactness of the data to be tested in the component a key is produced in the test device for each test, said key being different from those of prior tests. Using this key and a cryptographic algorithm one prepares two cryptograms. One cryptogram is prepared from the data to be tested by the component of the processing facility in which the data to be tested are stored. The other cryptogram is prepared from the intact data by the test device. After that the two cryptograms are compared with each other. If the cryptograms match, the data to be tested match the intact data and thus have no undesirable changes.

One advantage of this method is that one cryptogram is calculated by the test device and the other by the component to be tested. This also divides up the computing capacity required for forming the cryptograms.

A further advantage is that at each test a key is produced which is different from those of prior tests. The key thus does not have to be kept secret. There is no danger of the key being spied out.

Optionally the data from which the cryptograms are prepared can be dynamized by adding a random number at each test. The cryptograms prepared from the dynamized data then change when the same data are tested several times. This prevents fraudulent manipulation of the test by replaying cryptograms from earlier tests.

For preparing the cryptograms one preferably selects a cryptographic algorithm which simultaneously leads to a data reduction. The cryptograms therefore have amounts of data which are relatively small compared with the amounts of original data. The small amounts of data of these cryptograms make them easy and quick to exchange and compare.

In a development of the invention the stored data from several components of the processing facility can also be tested in one operation. For this purpose one stores in the test device a table in which it is stored, in accordance with the operating state of the processing facility, which of the components are to be tested, in which storage areas the data to be tested from the particular components are stored, and in which storage areas of the test device the corresponding and intact data are stored. With the help of this table the test device can prepare the cryptograms necessary for checking the individual components and compare them with the cryptograms produced by the particular components.

BRIEF DESCRIPTION OF THE DRAWINGS

Further features of the invention will result from the subclaims. In the following some embodiments of the invention will be described with reference to the figures, in which:

FIG. 2, made up of parts 2a and 2b, shows a flow chart of two embodiments of the cryptographic algorithm.

DETAILED DESCRIPTION OF PREFERRED EMBODIMENT(S) OF THE INVENTION

Figure 1:
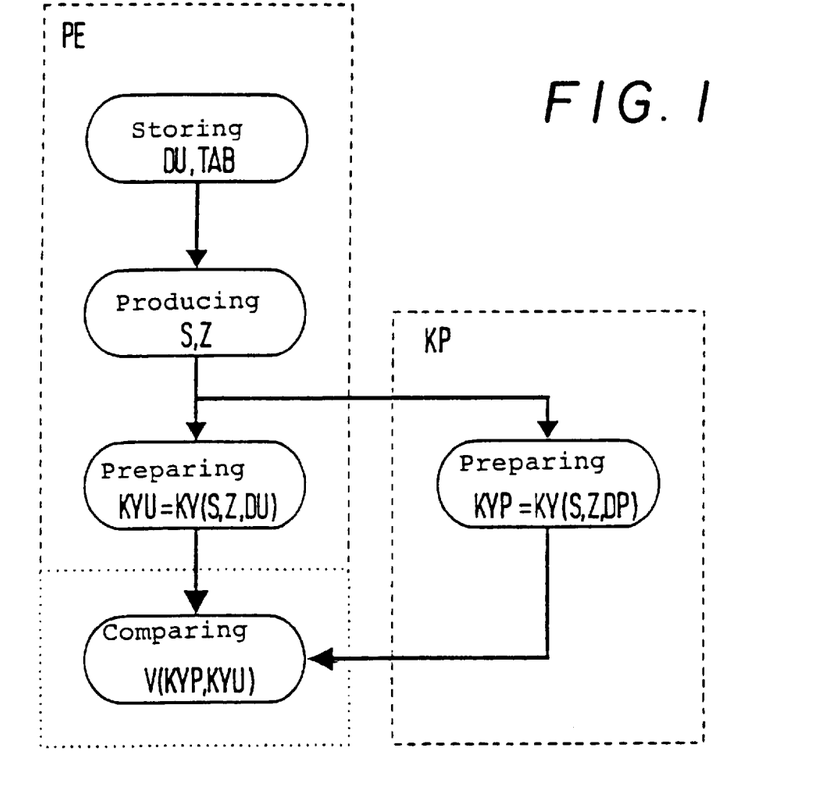
FIG. 1 shows a flow chart of a first embodiment of the invention.

FIG. 1 shows a flow chart of a first embodiment of the invention. For testing the intactness of stored data in component KP of a processing facility for sheet material by means of test device PE, intact data DU are first stored in test device PE. Intact data DU correspond to data DP to be tested in component KP of the processing facility in certain operating state BZ of the processing facility in the intact state.

At each test of stored data in component KP of the processing facility key S is produced by test device PE, said key being different at each test of data intactness. Key S is used for producing cryptograms by means of cryptographic algorithm KY. Optionally random number Z can also be produced by test device PE to be used for dynamizing data DP or DU.

Data S or Z necessary for preparing a cryptogram are then transferred from test device PE to component KP to be tested. A cryptogram is calculated by means of cryptographic algorithm KY and key S or random number Z both in test device PE and in component KP to be tested. In component KP of the processing facility cryptogram KYP is prepared from data DP to be tested. Cryptogram KYU is prepared from intact data DU by test device PE, intact data DU corresponding to data DP to be tested in the intact state.

Cryptograms KYU and KYP are then compared in comparison V. For this purpose cryptogram KYP is transferred from component KP to be tested to test device PE. Comparison V can be performed for example directly by test device PE. Another way to do comparison V is to output both cryptogram KYU and cryptogram KYP in readable form and have comparison V of the cryptograms done by operator BD of the processing facility.

If several components in the processing facility, or one component in different operating states BZ of the processing facility, or a combination of these two possibilities, are to be tested, table TAB can optionally be stored in the test device. In table TAB it is stored in accordance with possible operating states BZ of the processing facility which components are to be tested, in which storage areas SP data DP to be tested from the particular component are stored, and in which storage areas SU of test device PE corresponding and intact data DU are stored. In addition all intact data DU are stored in test device PE which occur in table TAB in accordance with possible operating states BZ of the processing facility.

Storage areas SP or SU can be defined for example using direct physical storage addresses or logical names. Direct physical storage addresses are generally used with semiconductor memories, such as RAMs, ROMs, EPROMs, EEPROMs or the like. A storage area can be fixed here for example by stating a start address and an end address in the memory or by stating a start address and the length of the storage area in the memory. With mass memories, such as hard disk drives, disk drives, streamers, CD-ROM drives or the like, logical names (file names) are generally used for fixing certain storage areas.

Figure 2A:
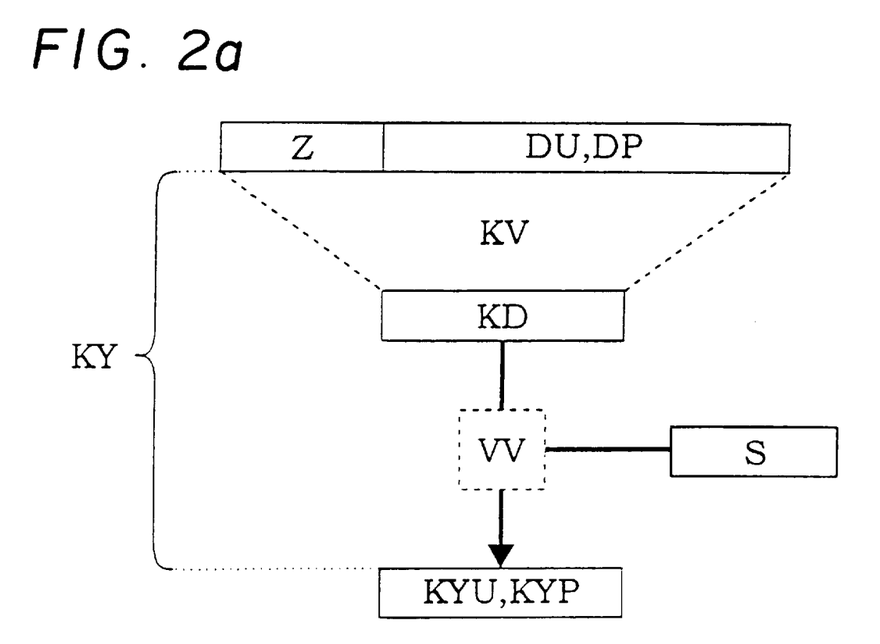

FIG. 2a shows an embodiment of cryptographic algorithm KY. Data DU or DP to be encoded can be dynamized here by adding random number Z before carrying out actual cryptographic algorithm KY. This dynamization can be performed to obtain different cryptograms KYU or KYP with otherwise identical cryptographic algorithm KY. This procedure can prevent cryptograms from old tests being spied out by a fraudulent manipulator of the processing facility and then replayed in the processing facility to simulate a correct test.

Data DU or DP optionally dynamized by random number Z are then compressed by compression method KV. Resulting compressed data KD are then encoded by encoding method VV using key S. The result of encoding method VV is then desired cryptogram KYU or KYP.

All common methods can generally be used for compressing and encoding. Known compression methods are for example hash functions. Encoding methods VV to be used are for example the Data Encryption Standard (DES) or public key methods such as the RSA algorithm.

Figure 2B:
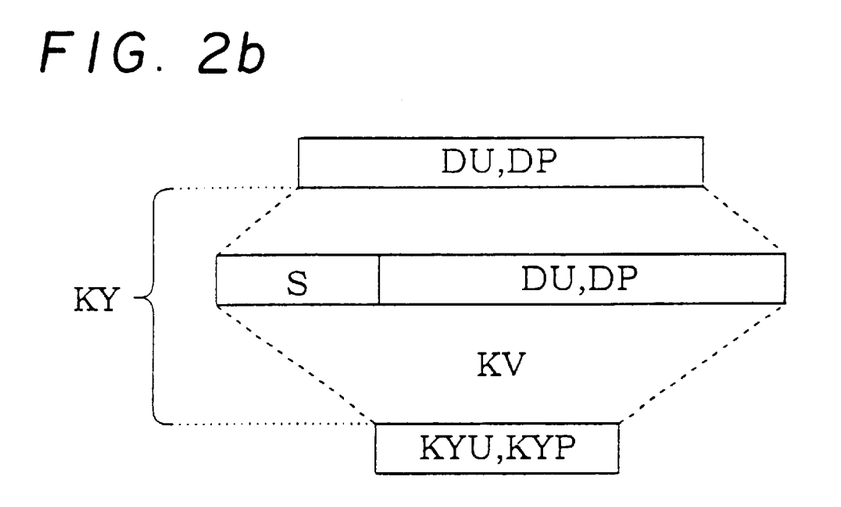

FIG. 2b shows a further embodiment of cryptographic algorithm KY. Here, key S is first added to data DU or DP to be encoded and they are then compressed directly into cryptogram KYU or KYP by compression method KV. In general other embodiments of cryptographic algorithm KY are also possible.

Figure 3:
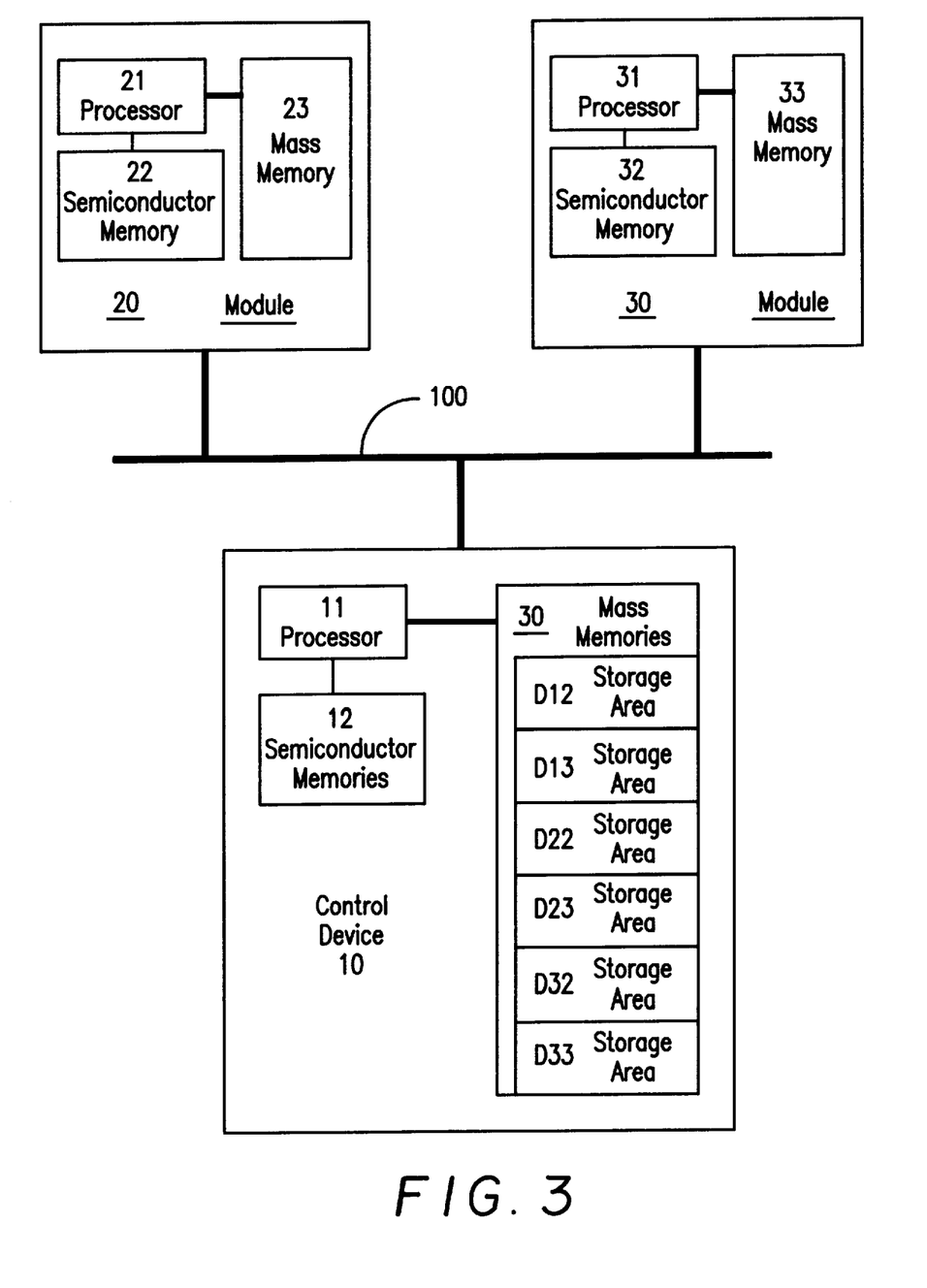
FIG. 3 shows a schematic diagram of the processing facility.

FIG. 3 shows a schematic diagram of a processing facility for sheet material. It is constructed here from three components 10, 20, 30, the individual components being connected via data line 100. Control device 10 is a component ranking higher than the other components and serves to control the individual processing operations. It has, among other things, processor 11 which can access semiconductor memories 12 and mass memories 13.

Semiconductor memories 12 can consist for example of volatile RAMs or nonvolatile ROMs, EPROMs, EEPROMs or similar memories. Generally the volatile RAM is used by processor 11 during the execution of a program. The nonvolatile memories contain data necessary for operating the processing facility. Storage areas of semiconductor memories 12 are generally fixed using direct physical storage addresses.

Mass memories 13 serve to store larger amounts of data and can be realized for example by hard disk drives, disk drives, CD-ROM drives or the like. Mass memories 13 store data necessary for operating the processing facility. Storage areas of mass memories 13 are generally fixed using logical names.

Further components of the processing facility shown here are two modules 20 and 30. Although they have the same block diagram they perform different functions in processing the sheet material within the processing facility. The number of modules was limited to two here merely for reasons of clearness.

Analogously to control device 10, each module 20, 30 has processor 21, 31, semiconductor memory 22, 32 and mass memory 23, 33, respectively. The data stored in memories 22, 23, 32, 33 serve to operate the particular module.

The data stored in memories 12, 13, 22, 23, 32, 33 are generally different and depend normally on operating state BZ of the processing facility and the function of the component.

Figure 4:
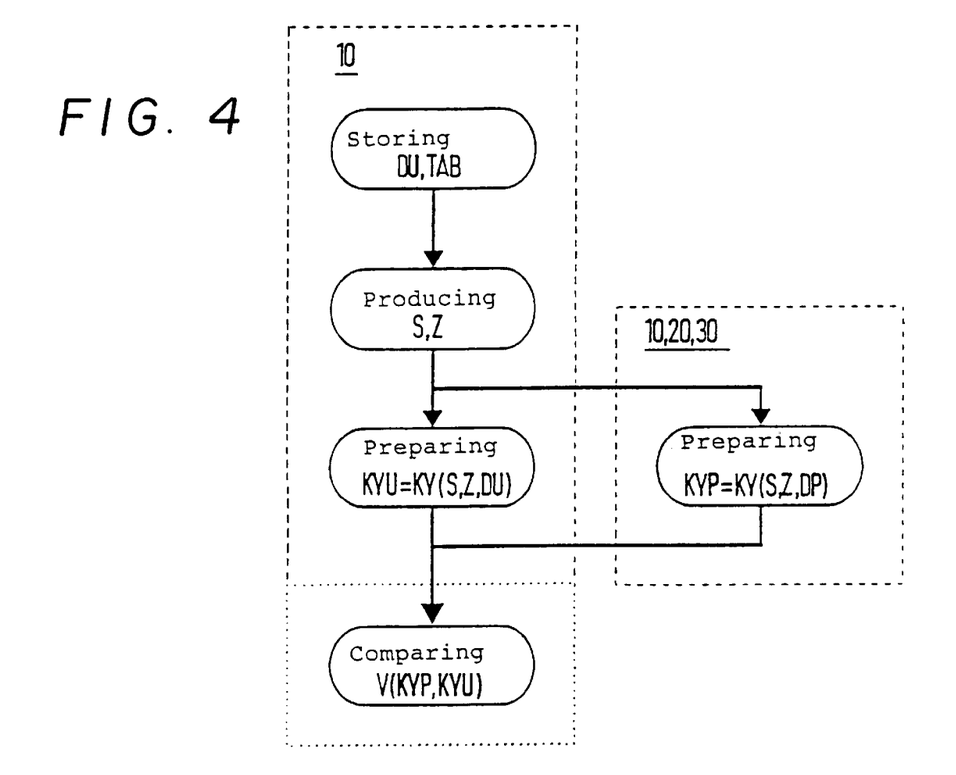
FIG. 4 shows a first implementation of the first embodiment of the invention.

In a flow chart of a first implementation of the first embodiment shown in FIG. 4 the functions of test device PE are performed by control device 10. Intact data DU corresponding to data DP to be tested stored in memories 12, 13, 22, 23, 32, 33 in the intact state are stored according to FIG. 3 in corresponding storage areas D12, D13, D22, D23, D32 and D33 in mass memory 13 of control device 10. Corresponding table TAB is additionally stored in mass memory 13 for testing a plurality of components of the processing facility. Cryptograms KYU necessary for testing are prepared by control device 10. Corresponding cryptograms KYP are prepared in the components to be tested. Components KP to be tested can be for example modules 20 or 30 here or else control device 10 itself. Comparison V of prepared cryptograms KYP and KYU is then performed by control device 10, or the cryptograms are outputted in readable form by control device 10 so that comparison V can be done by an operator of the processing facility.

Figure 5:
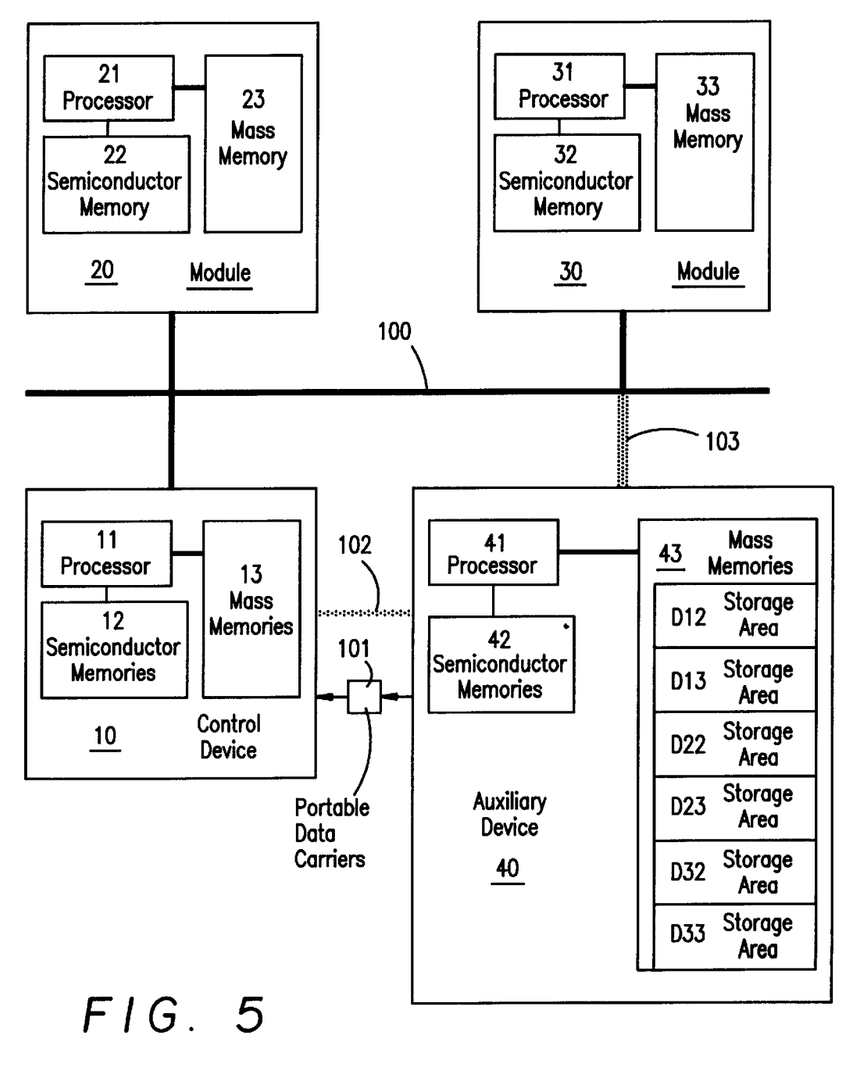
FIG. 5 shows a schematic diagram of a system comprising processing facility and auxiliary device.

FIG. 5 shows a schematic diagram of a processing facility additionally provided with auxiliary device 40. Auxiliary device 40 can be for example a personal computer which can be in a different place than the processing facility. Auxiliary device 40 also has processor 41, semiconductor memories 42 and mass memories 43. Since auxiliary device 40 is to perform the functions of test device PE in the following, intact data DU or table TAB necessary for testing are stored in mass memories 43 of auxiliary device 40.

The data exchange between auxiliary device 40 and the processing facility necessary for carrying out the test can take place in different ways. One possibility is for the data to be written by auxiliary device 40 on portable data carrier 101 which is then entered in control device 10. Portable data carriers 101 to be used are for example chip cards or diskettes.

A further possibility is to provide data line 102 which permits data exchange between control device 10 and auxiliary device 40. In accordance with the spatial circumstances data line 102 can consist of a direct connection of the two components or of a network.

Furthermore it is possible to connect auxiliary device 40 directly to internal data line 100 of the processing facility. In this case auxiliary device 40 can be regarded as a component of the processing facility.

Figure 6:
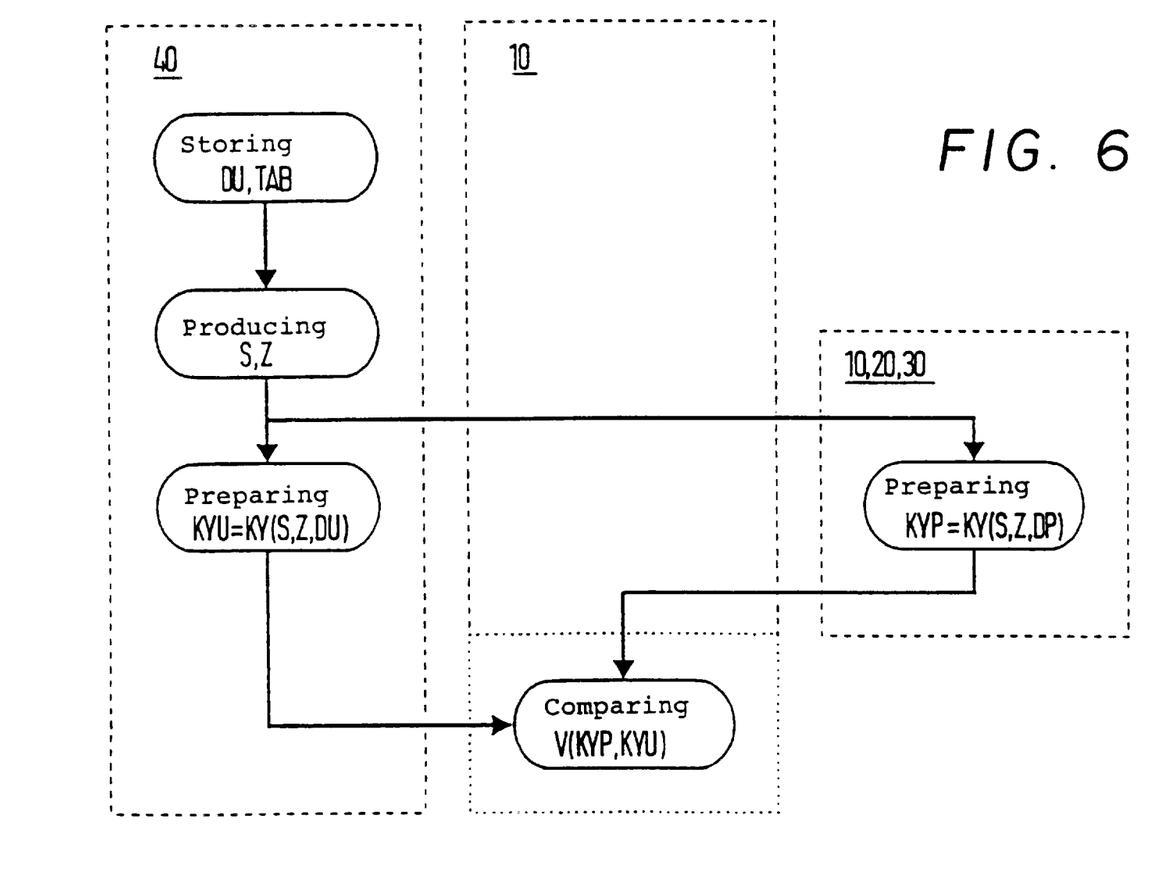
FIG. 6 shows a second implementation of the first embodiment of the invention.

FIG. 6 shows a flow chart of a second implementation of the first embodiment in a processing facility with auxiliary device 40. As explained above, intact data DU or table TAB are stored in auxiliary device 40. Furthermore key S or random number Z is produced in auxiliary device 40. For testing the intactness of stored data in the processing facility key S and random number Z are transferred to control device 10 via one of connections 101, 102, 103 described above.

For testing the intactness of the data, control device 10 must now be put in operating state BZ necessary for the check. This can be done either through information entered in control device 10 directly by the operator or through corresponding information transferred to control device 10 from auxiliary device 40. In accordance with this information control device 10 puts the processing facility in desired operating state BZ.

The information necessary for the test, i.e. which components are to be tested and in which storage areas SP data DP to be tested from particular components 10, 20, 30 are stored, can be read out of table TAB in accordance with desired operating state BZ by auxiliary device 40 and transferred to control device 10.

Another possibility is to store a copy of table TAB in control device 10. Control device 10 can then read the necessary information in accordance with adjusted operating state BZ directly out of the duplicate of table TAB.

Auxiliary device 40 then prepares necessary cryptograms KYU, while cryptograms KYP necessary for comparison are prepared in particular components 10, 20, 30 of the processing facility.

For comparison V of cryptograms KYU and KYP cryptograms KYU can now be transferred from auxiliary device 40 to control device 10 and compared there. Alternatively it is also possible to have cryptograms KYU and cryptograms KYP outputted in readable form by control device 10. Comparison of the cryptograms can then be done by the operator of the processing facility.

If portable data carrier 101 is selected as a transfer medium between auxiliary device 40 and control device 10, key S or random number Z as well as prepared cryptograms KYU can, for reasons of economy, be written on portable data carrier 101 in one working step and transferred to control device 10 all at once.

Figure 7:
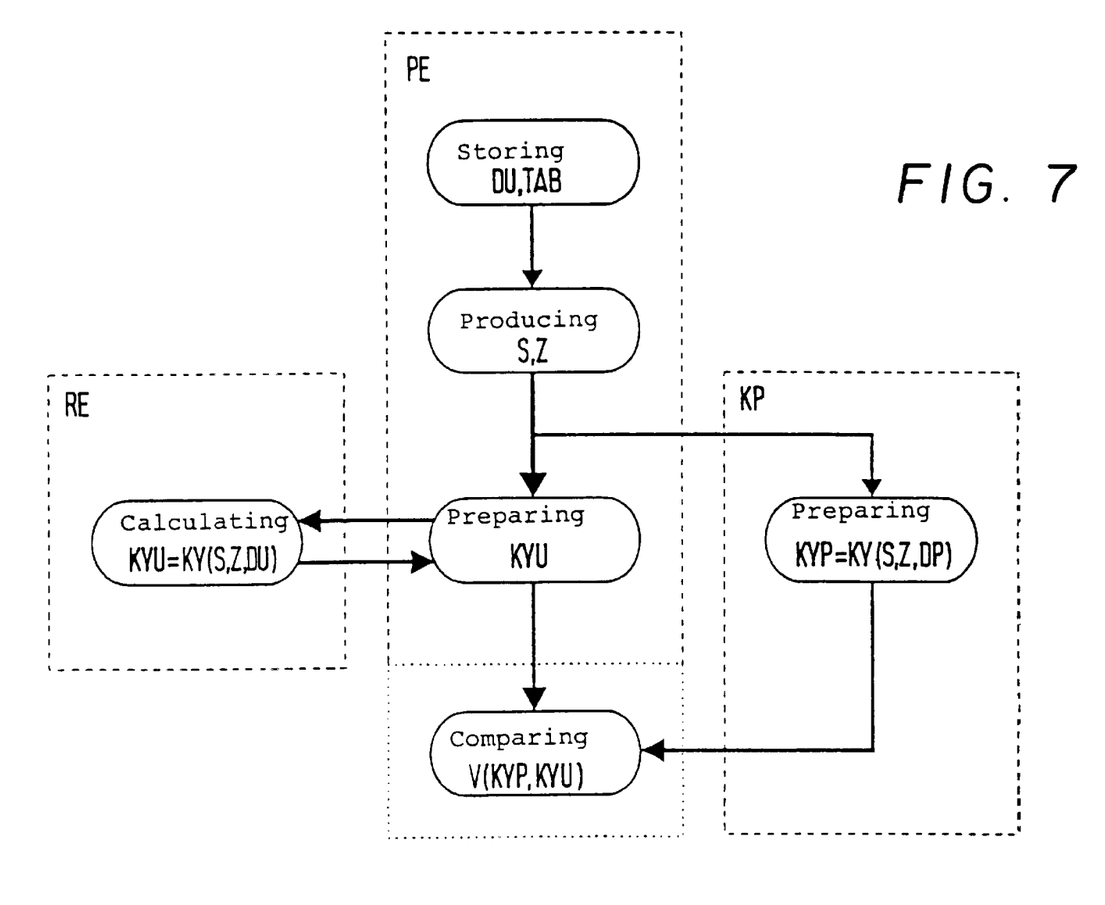
FIG. 7 shows a flow chart of a second embodiment of the invention.

FIG. 7 shows a flow chart of a further embodiment of the invention. If stored data from several components of the processing facility are tested, several cryptograms KYU must be prepared in test device PE. To relieve test device PE the calculation of the cryptograms is shifted in this embodiment to additional computing device RE. For this purpose intact data DU and key S or random number Z necessary for calculating cryptograms KYU are transferred to computing device RE. The latter then prepares cryptograms KYU from intact data DU and transfers cryptograms KYU back to test device PE. The other method steps are performed analogously to the description of the first embodiment.

Figure 8:
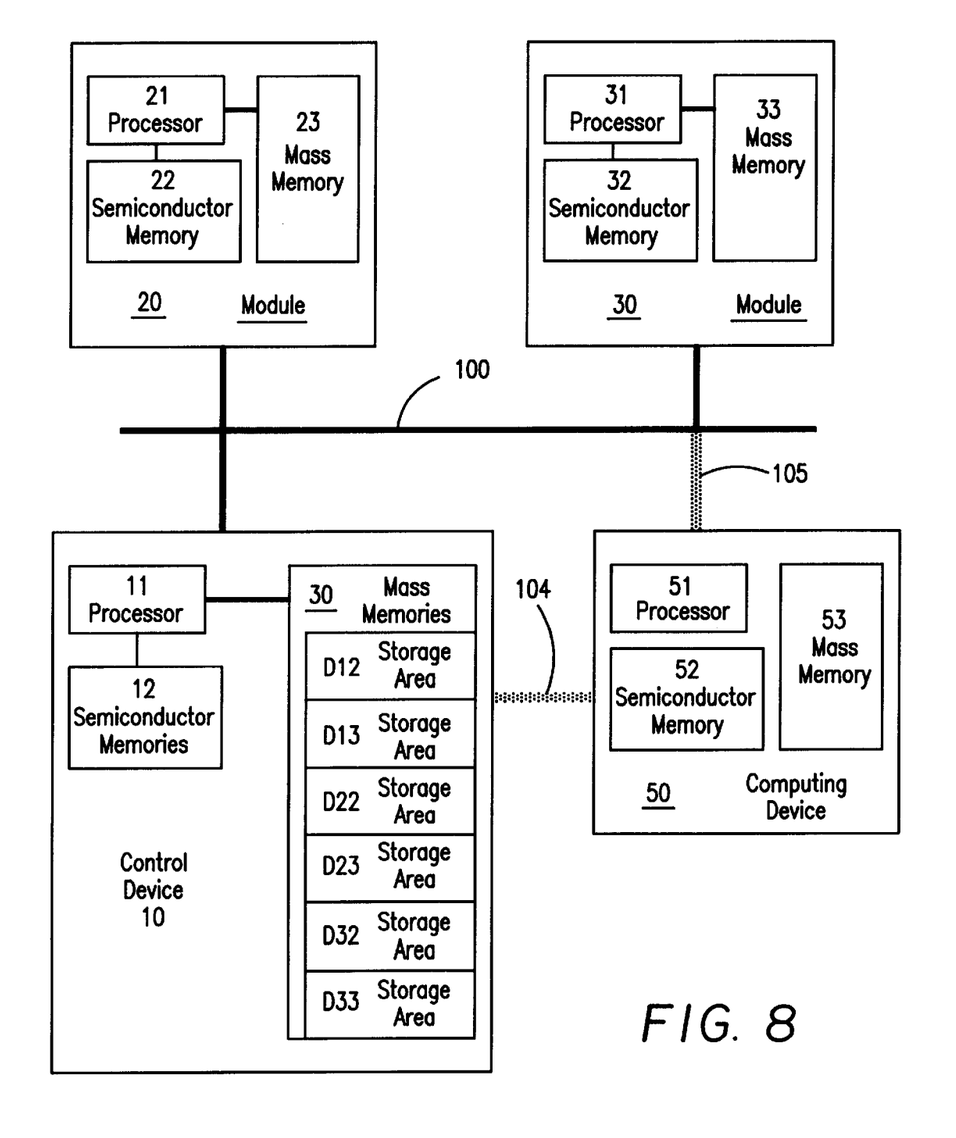
FIG. 8 shows a schematic diagram of an expanded processing facility.

FIG. 8 shows an expanded processing facility provided additionally with computing device 50. The latter also has processor 51, semiconductor memories 52 and mass memories 53. Computing device 50 can be realized for example by a personal computer. Computing device 50 is connected with the processing facility either via data line 104 analogous to data line 102 or via data line 105 analogous to data line 103.

Although it is basically possible to connect computing device 50 and control device 10 via a portable data carrier, this is not advisable here since intact data DU must be transferred from control device 10 to computing device 50 completely and intact data DU can involve very great amounts of data.

Figure 9:
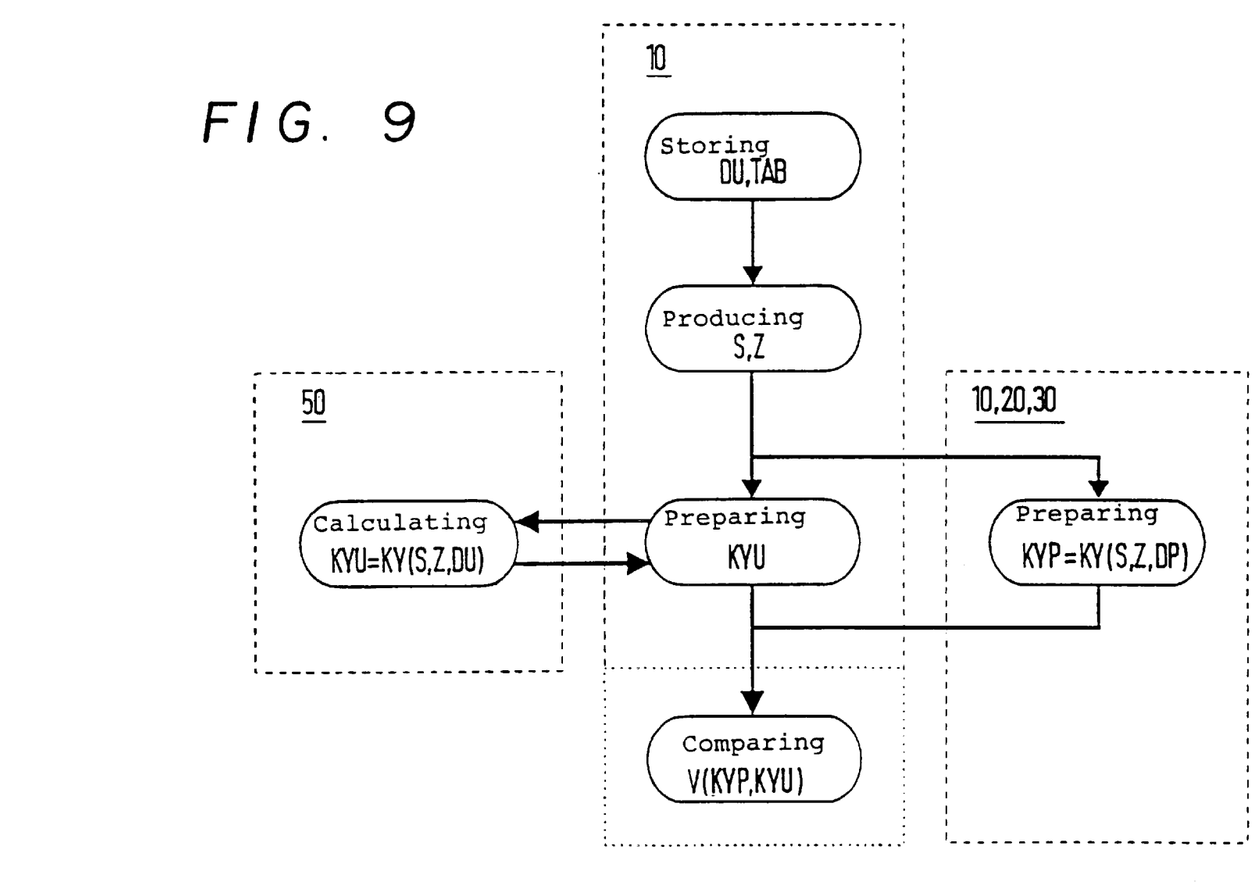
FIG. 9 shows an implementation of the second embodiment.

FIG. 9 shows a flow chart of an implementation of the second embodiment in a processing facility with computing device 50. This flow chart differs from that of the first implementation of the first embodiment in FIG. 4 only in that the calculation of cryptograms KYU is done in computing device 50 and they are then transferred to control device 10. Comparison V of cryptograms KYP and KYU can be done here again either directly in control device 10 or by the operator of the processing facility after output of the cryptograms in readable form.

Generally it is also possible to apply the invention to embodiments not explicitly described here. It is also possible to provide the memories stated in the embodiments for the individual components only in single form or even to omit them partly if required.

What is claimed is:

1. A method for testing whether data stored in a storage area of one of plurality of components in a processing facility for sheet material is intact, comprising the following steps:

storing intact data in a test device, the intact data corresponding to data stored in a data storage area of a component of the processing facility whose intactness is to be tested;

preparing a first cryptogram, the first cryptogram being calculated by causing said component to encrypt the data whose intactness is to be tested by means of a cryptographic algorithm and a key;

preparing a second cryptogram, the second cryptogram being calculated by causing said test device to encrypt the intact data by means of the cryptographic algorithm and the key; and making a comparison of the first and second cryptograms.

2. The method of claim 1, further comprising the step of storing a table in the test device for testing stored data from a plurality of components of the processing facility, the following data being stored in said table:

which of the components are to be tested, in which storage areas the data to be tested from the particular components are stored, and in which storage areas of the test device the corresponding intact data are stored.

3. The method of claim 2, further comprising the step of accessing the storage areas using one of the following: (i) direct physical storage addresses, (ii) logical names, and (iii) both direct physical storage addresses and logical names.

4. The method of claim 2, wherein the processing facility is operable in different operating states, and the table is at least partly dependent on at least one certain operating state.

5. The method of claim 1, further comprising the step of dynamizing the data by addition of a random number before execution of the cryptographic algorithm.

6. The method of claim 1, further comprising the step of first compressing the data using the cryptographic algorithm and then encrypting the compressed data using the key.

7. The method of claim 1, wherein the step of preparing the second cryptogram comprises the steps of:

transferring the intact data and the key from the test device to a computing device via a data line, calculating the second cryptogram using the computing device and transferring the second cryptogram to the test device using the computing device via the data line.

8. The method of claim 7, wherein the computing device is one of said components of the processing facility.

9. The method of claim 7, wherein the computing device is an external device.

10. The method of claim 1, wherein the test device is one of said components of the processing facility.

11. The method of claim 1, wherein the test device is an external device.

12. The method of claim 11, further comprising the step of transferring data necessary for testing between the processing facility and the external device by means of a portable data carrier.

13. The method of claim 11, further comprising the step of transferring data necessary for testing between the processing facility and the external device by means of a data line.

14. The method of claim 1, wherein the step of performing the comparison is performed by the test device.

15. The method of claim 1, further comprising the step of outputting the cryptograms in readable form, and wherein the step of performing the comparison is performed by an operator of the processing facility.

16. The method of claim 1, further comprising the step of producing the key by the test device.

17. The method of claim 16, further comprising the step of using a different key for each test of data intactness.

18. The method of claim 2, wherein the processing facility is operable in different operating states, and the data to be tested from a component of the processing facility are at least partly dependent on at least one certain operating state.

* * * * *